(12) United States Patent
Hedouin et al.

(10) Patent No.: US 6,358,880 B1
(45) Date of Patent: Mar. 19, 2002

(54) SUPPORT COMPOSITION BASED ON A CERIUM OXIDE, A ZIRCONIUM OXIDE AND A SCANDIUM OR RARE EARTH OXIDE AND USE FOR TREATING EXHAUST GAS

(75) Inventors: Catherine Hedouin, Gouvieux; Thierry Seguelong, Puteaux, both of (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/554,156

(22) PCT Filed: Nov. 9, 1998

(86) PCT No.: PCT/FR98/02392

§ 371 Date: Jul. 17, 2000

§ 102(e) Date: Jul. 17, 2000

(87) PCT Pub. No.: WO99/24153

PCT Pub. Date: May 20, 1999

(30) Foreign Application Priority Data

Nov. 10, 1997 (FR) ............................................ 97 14083

(51) Int. Cl.⁷ ............................ B01J 23/00; B01J 23/32; B01J 23/02; B01J 8/02; B01D 47/00

(52) U.S. Cl. ...................... 502/302; 502/303; 502/304; 502/324; 502/340; 502/341; 502/344; 502/349; 502/355; 423/212; 423/213.2

(58) Field of Search ................................. 502/302–304, 502/324, 340, 341, 344, 349, 355; 423/212, 213.2

(56) References Cited

U.S. PATENT DOCUMENTS

| | | | | | |
|---|---|---|---|---|---|
| 4,927,799 | A | * | 5/1990 | Matsumoto et al. | ........ 502/303 |
| 5,075,276 | A | * | 12/1991 | Ozawa et al. | ............... 502/304 |
| 5,759,947 | A | * | 6/1998 | Zhou | ........................ 502/304 |
| 6,040,265 | A | * | 3/2000 | Nunan | ........................ 502/242 |

* cited by examiner

Primary Examiner—Mark L. Bell
Assistant Examiner—Patricia L. Hailey
(74) Attorney, Agent, or Firm—John A. Shedden

(57) ABSTRACT

A composition is disclosed for reducing nitrogen oxide emissions from gases which comprises a support based on a cerium oxide, a zirconium oxide and an oxide of scandium or a rare earth other than cerium, and a supported phase based on manganese and at least one other element which is an alkali metal, alkaline-earth metal or a rare earth.

18 Claims, No Drawings

SUPPORT COMPOSITION BASED ON A CERIUM OXIDE, A ZIRCONIUM OXIDE AND A SCANDIUM OR RARE EARTH OXIDE AND USE FOR TREATING EXHAUST GAS

This application is an application under 35 U.S.C. Section 371 of International Application Number PCT/FR98/02392 filed on Nov. 9, 1998.

The present invention relates to a composition containing a support based on a cerium oxide, a zirconium oxide and a scandium or rare-earth oxide and use for exhaust gas treatment.

It is known that the nitrogen oxide (NOx) emissions in exhaust gases from motor vehicles are reduced, in particular, with the aid of three-way catalysts, which stoichiometrically use the reducing gases present in the mixture. Any oxygen excess leads to a pronounced deterioration in the catalyst's performance.

However, certain engines, for example, diesel engines or lean-burn patrol engines, save on fuel but emit exhaust gases which permanently contain a large oxygen excess, of for example at least 5%. A standard three-way catalyst is therefore ineffective for the NOx emissions in this case. Furthermore, it has become imperative to limit NOx emissions owing to the tightening of motor vehicle emission standards which have now have been extended to these engines.

There is therefore a genuine need for an efficient catalyst to reduce NOx emissions for these types of engines and, generally, for treating games containing NOx.

As a type of catalyst which can meet this need, systems referred to as NOx traps have been proposed which are capable of oxidizing NO into $NO_2$ and then of absorbing the $NO_2$ thus formed. Under certain conditions, the $NO_2$ is re-released then reduced to $N_2$ by reducing species contained in the exhaust gas. These NOx traps are generally based on platinum. However, platinum is an expensive element. It would therefore be beneficial to provide a platinum-free system in order to reduce the costs of the catalysts.

The object of the invention is therefore to develop a catalyst which can be used as an NOx trap without necessarily using platinum.

To this end, the composition of the invention is characterized in that it comprises a support based on a cerium oxide, a zirconium oxide and an oxide of scandium or a rare earth other than cerium, and a supported phase based on manganese and at least one other element selected from the alkali metals, the alkaline-earth metals and the rare earths.

The invention also relates to a process for treating gases with a view to reducing nitrogen oxide emissions which is characterized in that a composition as defined above is used.

Other characteristics, details and advantages of the invention will become yet more fully apparent on reading the following description, as well as the various concrete but non-limiting examples intended to illustrate it.

The composition of the invention comprises a phase supported on a support.

The supported phase may more particularly correspond to two variants.

According to a first variant, this phase is based, further to manganese, on an alkali metal and/or an alkaline-earth metal. The alkali metal may more particularly be sodium or potassium. The alkaline-earth metal may more particularly be barium or strontium.

According to a second variant, the supported phase is based on manganese and at least one element selected from the rare earths.

Here, and for all of the description, the term rare earth is intended to mean the elements in the group consisting of yttrium and the elements in the Periodic Table having an atomic number of between 57 and 71 inclusive.

The rare earth may more particularly be elected from lanthanum, cerium, praseodymium, neodymium, europium, samarium, gadolinium or terbium. As an advantageous embodiment in the scope of this second variant, mention may be made of a supported phase based on manganese and praseodymium.

Lastly, it is entirely possible in the scope of the present invention to have a supported phase based on manganese and at least two other elements, one being a rare earth and the other being selected from the alkali metals and the alkaline-earth metals.

According to a particular embodiment, the composition of the invention can be obtained by a process in which at least one of the two elements manganese and potassium is supplied at least partially by potassium permanganate. It should be noted that a single element may be supplied by the permanganate, and only partially. Conversely, and preferentially, it is also possible to supply the two elements fully by the permanganate route. All of the variants between these two possibilities may be envisaged. This embodiment makes it possible to obtain compositions having high NOx adsorption capacities.

Another important characteristic of the composition of the invention is the nature of the support of the supported phase.

As indicated above, the support is based on a cerium oxide, a zirconium oxide and an oxide of scandium or a rare earth other than cerium. It is to be emphasized here, and for all of the description, that the invention also applies to any support based on cerium oxide, zirconium oxide and, as a third element, a combination of two or more oxides selected from scandium oxide and the rare-earth oxides.

The supports used are preferably those for which the cerium/zirconium atomic proportion is at least 1.

As a rare earth involved in the composition of the support, mention may more particularly be made of lanthanum, neodymium and praseodymium.

Use may also more particularly be made of the supports satisfying the overall formula $Ce_xZr_yM_zO_2$ where M represents at least one element selected from the group comprising scandium and the rare earths other than cerium and where x, y and z satisfy the relationships $0<z\leq0.3$, $1\leq x/y\leq19$ and $x+y+z=1$.

More particularly, x, y and z may satisfy the following relationships $0.02<z<0.2$, $1<x/y<9$, it being, more particularly still, possible for the last ratio to be between 1.5 and 4, these limits being inclusive.

According to a particular embodiment, the support is in the form of a solid solution. In this case, the X-ray diffraction spectra of the support reveal the existence of a single homogeneous phase within it. As regards supports which are richer in cerium, this phase actually corresponds to that of a crystallized cerium oxide $CeO_2$ whose lattice parameters are shifted to a greater or lesser extent relative to a pure cerium oxide, thus reflecting the incorporation of zirconium and the other element (scandium and rare earths other than cerium) in the crystal lattice of the cerium oxide, and therefore the fact that a genuine solid solution is obtained.

According to a preferred variant of the invention, supports are used which are characterized by their specific surface at certain temperatures, as well as their oxygen storage capacity.

The term specific surface is intended to mean the BET specific surface determined by nitrogen adsorption according to the standard ASTM D 3663–78 established on the basis of the Brunauer - Emmett - Teller method described in the periodical "The Journal of the American Society, 60, 309 (1938)".

It is thus possible to use supports which have a specific surface after calcining for 6 hours at 900° C. of at least 35 m$^2$/g. This surface may more particularly be at least 40 m$^2$/g. It may, more particularly still, be at least 45 m$^2$/g.

These supports may also have surfaces which are still considerable even after calcining for 6 hours at 1000° C. These surfaces may be at least 14 m$^2$/g, more particularly at least 20 m$^2$/g and more particularly still at least 30 m$^2$/g.

Another characteristic of the supports of this variant is their oxygen storage capacity. This capacity, measured at 400° C., is at least 1.5 ml O$_2$/g. It may more particularly be at least 1.8 ml O$_2$/g and more particularly still at least 2 ml O$_2$/g. In the best cases, this capacity my be at least 2.5 ml O$_2$/g. This capacity is determined by a test which evaluates the capacity of the support, or of the product, to successively oxidize amounts of carbon monoxide injected with oxygen and to consume infected amounts of oxygen to reoxidize the product. The method employed is referred to as an alternative method.

The carrier gas is pure helium at a flow rate of 10 l/h. The injections are carried out by means of a loop containing 16 ml of gas. The amounts of CO are injected using a gas mixture containing 5% CO diluted in helium, while the amounts of O$_2$ are injected by employing a gas mixture containing 2.5% O$_2$ diluted in helium. The gases are analysed by chromatography using a thermal conductivity detector.

The amount of oxygen consumed makes it possible to determine the oxygen storage capacity. The characteristic value of the oxygen storage power is expressed in ml of oxygen (under standard temperature and pressure conditions) per gram of product introduced, and is measured at 400° C. The measurements of oxygen storage capacity given here, and in the rest of the description, are taken from products pretreated at 900° C. under air for 6 hours in a muffle furnace.

The supports of the composition of the invention can be prepared in known fashion. They may thus be obtained using a solid/solid reaction of the oxides or any other precursor such as carbonates. They may also be prepared by a wet route, that is to say by precipitation with a base of the salts of cerium, zirconium and the third element or elements, then calcining.

In the case of the preferred above-described variant employing supports defined by their specific surface and their oxygen storage capacity, the support may be obtained by a process in which a mixture is prepared in a liquid medium containing a cerium compound, a scandium or rare-earth compound and a zirconium solution, which is such that the amount of base needed to reach the equivalence point during an acid-base titration of this solution satisfies the molar ratio condition OH$^-$/Zr≦1.65; the said mixture is heated; the precipitate obtained is recovered and this precipitate is calcined.

This process will now be described more specifically.

The first step of this process consists in preparing a mixture in a liquid medium, generally in the aqueous phase, containing at least one cerium compound, at least one zirconium compound and a scandium or rare-earth compound. This mixture is prepared by using a zirconium solution.

This zirconium solution may be produced by acid attack on a reagent containing zirconium. Examples of suitable reagents include zirconium carbonate, hydroxide or oxide. The attack may be carried out using an inorganic acid such as nitric acid, hydrochloric acid or sulphuric acid. Nitric acid is the preferred acid, and the use of a zirconyl nitrate produced by nitric attack on a zirconium carbonate may thus most particularly be mentioned. The acid may also be an organic acid such as acetic acid or citric acid.

This zirconium solution must have the following characteristic. The amount of base needed to reach the equivalence point during an acid-base titration of this solution must satisfy the molar ratio condition OH$^-$/Zr≦1.65. Most particularly, this ratio may be at most 1.5, or yet more particularly, at most 1.3. In general, the specific surface of the product obtained tends to increase as this ratio decreases.

The acid-base titration is carried out in a way that is known. In order to carry it out under optimum conditions, a solution may be titrated which has been adjusted to a concentration of about 3.10$^{-2}$ mol per litre, expressed in terms of the element zirconium. Whilst stirring, a 1N sodium hydroxide solution is added to it. Under these conditions, the determination of the equivalence point (change of the pH of the solution) takes place cleanly. This equivalence point is expressed by the OH$^-$/ZR molar ratio.

Particular examples of cerium compounds which may be mentioned include cerium salts such as cerium(IV) salts, such as nitrates or ammonium ceric nitrates for example, which are particularly suitable here. Ceric nitrate is preferably used. The solution of cerium(IV) salts may contain cerium in the cerus state, but it is preferable for it to contain at least 85% of cerium(IV). An aqueous solution of ceric nitrate may, for example, be obtained by reacting nitric acid with a hydrated ceric oxide prepared conventionally by reacting a solution of a cerus salt, for example cerus nitrate, with an ammonia solution in the presence of hydrogen peroxide. It is also possible to use a ceric nitrate solution which is obtained according to the process involving electrolytic oxidation of a cerus nitrate solution, as described in the document FR-A-2 570 087, and which may constitute an advantageous starting material.

It will be noted here that the aqueous solution of cerium (IV) salts may have some degree of initial free acidity, for example a normality varying between 0.1 and 4 N. According to the present invention, it is equally possible to employ an initial solution of cerium(IV) salts actually having some degree of free acidity, as mentioned above, as well as a solution which has been neutralized beforehand, more or less powerfully, by adding a base such as, for example, an ammonia solution or alkaline metal (sodium, potassium, etc.) hydroxides, but preferably an ammonia solution, so as to limit this acidity. It is then possible, in the latter case, practically to define a degree of neutralization (r) for the initial cerium solution by the following equation:

$$r = \frac{n3 - n2}{n1}$$

in which n1 represents the total number of moles of Ce(IV) present in the solution after neutralization; n2 represents the number of moles of OH$^-$ions actually needed to neutralize the initial free acidity contributed by the aqueous solution of cerium(IV) salt; and n3 represents the total number of moles of OH$^-$ ions contributed by the addition of the base. When the "neutralization" variant is employed, the amount of base used will in all cases be necessarily less than the amount of base needed to obtain full precipitation of the hydroxide species Ce(OH)$_4$ (r=4). In practice, this will involve a limitation to degrees of neutralization of no more than 1, and more preferably no more than 0.5.

The scandium or rare-earth compounds are preferably compounds which are soluble in water, in particular.

As examples of scandium or rare-earth compounds which can be used in the process in question, mention may for example be made of the salts of inorganic or organic acids, for example of the sulphate, nitrate, chloride or acetate type. It will be noted that the nitrate is particularly well-suited. These compounds may also be supplied in the form of sols. These sols can be obtained, for example, by neutralizing a salt of these compounds using a base.

The amount of cerium, zirconium and rare earths or scandium present in the mixture must correspond to the stoichiometric proportions required for obtaining a support with the desired final composition.

Once the initial mixture has been obtained in this way, it is then heated, according to the second step of the process in question.

The temperature at which this heat treatment, also referred to as thermohydrolysis, is carried out may be between 80° C. and the critical temperature of the reaction medium, in particular between 80 and 350° C., preferably between 90 and 200° C.

Depending on the temperature conditions adopted, this treatment may be carried out either under normal atmospheric pressure or under a pressure such as, for example, the saturated vapour pressure corresponding to the temperature of the heat treatment. When the treatment temperature is chosen to be above the reflux temperature of the reaction medium (i.e. generally above 100° C.), for example chosen between 150 and 350° C., the operation is then carried out by introducing the aqueous mixture containing the aforementioned species into a sealed enclosure (closed reactor move commonly referred to as an autoclave), in which case the required pressure results merely from the heating of the reaction medium (autogenous pressure). Under the temperature conditions given above, and in an aqueous medium, it may thus be indicated by way of illustration that the pressure in the closed reactor varies between a value in excess of 1 bar ($10^5$ Pa) and 165 bar ($165.10^5$ Pa), preferably between 5 bar ($5.10^5$ Pa) and 165 bar ($165.10^5$ Pa). It is of course also possible to exert an external pressure, which is then added to that due to the heating.

The heating may be carried out either under an air atmosphere or under an inert gas atmosphere, preferably nitrogen.

The treatment time is not critical, and may thus vary within wide limits, for example between 1 and 48 hours, preferably between 2 and 24 hours.

At the end of the heating step, a solid precipitate is recovered which can be separated from its medium by any conventional solid/liquid separation technique, for example filtration, settling, drying or centrifuging.

It may be advantageous to introduce a base, for example an ammonia solution, into the precipitation medium after the heating step. This makes it possible to increase the yields with which the precipitated species is recovered.

It is also possible to add hydrogen peroxide in the same way, after the heating step.

The product, as recovered, may then be washed with water and/or aqueous ammonia, at a temperature between room temperature and the boiling point. In order to remove the residual water, the washed product may lastly, if appropriate, be dried for example in air, this being done at a temperature which may vary between 80 and 300° C., preferably between 100 and 150° C., the drying being continued until a constant weight is obtained.

It will be noted that it is, of course, possible for a heating step as described above to be repeated one or more times, identically or differently, after recovery of the product and optional addition of the base or hydrogen peroxide, in which case the product is returned to a liquid medium, in particular in water, and for example heat treatment cycles are carried out.

In a last step of the process, the recovered precipitate is then calcined, after optional washing and/or drying. According to a particular embodiment, after the thermohydrolysis treatment and optionally after returning the product to a liquid medium and an additional treatment, it is possible to dry the reaction medium obtained directly by spraying.

The calcining is carried out at a temperature of generally between 200 and 1200° C., and preferably between 300 and 900° C. This calcining temperature must be sufficient to convert the precursors into oxides, and is also chosen on the basis of the future working temperature of the support and while taking into account the fact that the specific surface of the product becomes commensurably lower as the calcining temperature employed increases. For its part, the calcining time can vary within wide limits, for example between 1 and 24 hours, preferably between 4 and 10 hours. The calcining is generally carried out under air, but calcining carried out, for example, under an inert gas is clearly not to be ruled out.

The supported phase may be deposited on the support in a known way. The procedure used may involve an impregnation method. A solution or slip of salts or compounds of the elements in the supported phase will thus firstly be formed.

Examples of salts which may be chosen include salts of inorganic acids, such as nitrates, sulphates or chlorides.

It is also possible to use salts of organic acids, and in particular salts of saturated aliphatic carboxylic acids or salts of hydroxycarboxylic acids. Examples which may be mentioned include formates, acetates, propionates, oxalates or citrates.

The support is then impregnated with the solution or slip. After impregnation, the support is optionally dried, and is then calcined. It should be noted that it is possible to use a support which has not yet been calcined prior to the impregnation.

The supported phase may also be deposited by atomizing a suspension based on salts or compounds of the elements of the supported phase and of the support.

It may be advantageous to deposit the elements of the supported phase in two steps. Thus, in the case of supported phases based on manganese and potassium and manganese and praseodymium reciprocally, the manganese then the potassium may advantageously be deposited in the first case, and the praseodymium then the manganese in the second case.

As indicated above, for the particular embodiment which applies to the case in which the supported phase comprises manganese and potassium, at least one of the elements manganese and potassium may be supplied at least partially by potassium permanganate.

It should lastly be noted that it is possible in the scope of the present invention for at least one of the elements of the supported phase to be introduced into the support during the actual preparation of the latter.

The levels of manganese, alkali metals, alkaline-earth metals and rare earths can vary in wide proportions. The minimum proportion is that below which NOx adsorption activity is no longer observed. They may in particular be between 2 and 50%, more particularly between 5 and 30%, these levels being expressed as atomic % with respect to the sum of the elements of the support and the elements relevant to the supported phase.

The compositions of the invention, as described above, are in the form of powders but may optionally be shaped to be in the form of granules, balls, cylinders or honeycombs of variable sizes. The compositions may thus be used in catalytic systems comprising a wash coat having catalytic properties and based on these compositions, on a substrate of, for example, the metallic or ceramic monolith type.

The invention also relates to a process for treating gases with a view to reducing nitrogen oxide emissions employing the compositions of the invention.

The gases which can be treated by the present invention are, for example, those output by gas turbines, thermal power station boilers or alternatively internal-combustion engines. In the latter case, these may in particular be diesel engines or lean-burn engines.

When they are brought into contact with gases which have a high level of oxygen, the compositions of the invention function as NOx traps. The term gases having a high level of oxygen is intended to mean gases having an oxygen excess with respect to the amount needed for stoichiometric combustion of the fuels and, more precisely, gases having an oxygen excess with respect to the stoichiometric value $\lambda=1$. The value $\lambda$ is correlated with the air/fuel ratio in a manner which is known per se, in particular in the field of internal-combustion engines. Such gases are those from a lean-burn engine which have a level of oxygen (expressed by volume) of at least 2%, as well as those which have an even higher level of oxygen, for example gases from engines of the diesel type, that is to say at of least 5% or more than 5%, more particularly 10%, it being possible for this level to lie between 5 and 20%, for example.

The compositions of the invention may be associated with complementary emission control systems, such as three-way catalysts, which are effective when the value of $\lambda$ is less than or equal to 1 in the gases, or alternatively in systems involving fuel injection or exhaust gas recirculation (EGR) for diesel engines. They may also be associated with NOx catalysts for diesel engines.

The invention also relates to a catalytic system for treating gases with a view to reducing nitrogen oxide emissions, which gases may be of the type mentioned above and, more particularly, those having an oxygen excess relative to the stoichiometric value. This system is characterized in that it comprises a composition as described above.

Examples will now be given.

EXAMPLES

Preparation of the support

A support is used based on cerium oxide, zirconium oxide and lanthanum oxide in respective proportions by weight with respect to the oxides of 72/24/4. This oxide is prepared in the following way:

In the stoichiometric proportions required to obtain the above composition, a solution of ceric nitrate preneutralized by adding $NH_4OH$ such that r=−0.22 (r being as defined above), a solution of lanthanum nitrate and a solution of zirconyl nitrate which, in the sense defined above, satisfies the molar ratio condition $OH^-/Zr=1.17$, are mixed.

The concentration of this mixture (expressed as oxides of the various elements) is adjusted to 80 g/l. This mixture is then heated to 150° C. for 4 hours.

An ammonia solution is then added to the reaction medium such that the pH is higher than 8.5. The reaction medium thus obtained is heated to boiling for 2 hours. After settling then drawing off, the solid product is re-suspended and the medium thus obtained is treated for 1 hour at 100° C. The product is then filtered. The product intended for use as a support for the rest of the examples is calcined at a temperature of 550° C. for 2 hours.

It should be noted that the product calcined at 900° C. for 6 hours has a specific surface of 51 $m^2/g$. Its oxygen storage capacity measured under the conditions given above is 2.8 ml $O_2/g$.

Preparation of the Catalyst

Starting materials

Use is made of manganese nitrate $Mn(NO_3)_2$, praseodymium nitrate $Pr(NO_3)_3$, potassium nitrate $KNO_3$, potassium permanganate $KMnO_4$ and barium acetate $Ba(C_2H_3O_2)_2$.

Elements of the supported phase, level and deposition

The procedure for the deposition involves two steps.

1st step: Deposition of the first active element

This step consists in depositing the active element in an amount which varies between 5 and 10 atomic % in the case of Mn and 15 atomic % in the case of Ba and Pr, and is calculated in the following way:

$[X]/([X]+[CeO_2]+[ZrO_2]+[La_2O_3])=0.05$ or $0.1$ with X=Mn $[X]/([X]+[CeO_2]+[ZrO_2]+[La_2O_3])=0.15$ with X=Pr, Ba 2nd Step: Deposition of the second active element This step consists in depositing the second active element in an amount which varies between 15 and 20 atomic % in the case of K and 5 atomic % in the case of Mn, and is calculated in the following way:

$[Y]/([X]+[Y]+[CeO_2]+[ZrO_2]+[La_2O_3])=0.15$ or $0.2$ with Y=K $[Y]/([X]+[Y]+[CeO_2]+[ZrO_2]+[La_2O_3])=0.05$ with Y=Mn In the case in which potassium permanganate ($KMnO_4$) is used as a precursor, the deposition is carried out in a single stage. The number of moles deposited is equal to 13.6% calculated in the following way:

$[X]/([X]+[CeO_2]+[ZrO_2]+[La_2O_3])=0.136$ with $X=KMnO_4$

Two deposition methods are used: dry impregnation for Example 1 and Buchi® atomization in the other cases.

Dry impregnation

This consists in impregnating the support in question with the element of the supported phase dissolved in a solution whose volume is equal to the pore volume of the support (determined with water: 0.5 $cm^3/g$) and whose concentration makes it possible to achieve the desired concentration.

In the present case, the elements are impregnated on the support one after the other.

The operating protocol is as follows:

dry impregnation of the first element stove drying (110° C., 2 h)

calcining for 2 h at 600° C. (3° C./min)

dry impregnation of the second element stove drying (110° C., 2 h)

calcining for 2 h at 600° C. (5° C./min).

Buchi® atomization:

A suspension containing the element to be deposited and the support (C=150 g/l) is prepared. The suspension is then Buchi® atomized. The dried solid is calcined for 2 hours at 600° C. (rise rate 5° C./min).

The operation is repeated with the second element to be deposited.

The Buchi® input and output temperatures are respectively equal to 210° C. at 120° C.

Catalytic test

The catalytic test is carried out in the following way:

0.15 g of the NOx trap in powder form is introduced into a quartz reactor. The powder used has been compacted beforehand and ground and screened so as to isolate the particle size fraction between 0.125 and 0.250 mm.

The reaction mixture at the inlet of the reactor has the following composition (by volume):

NO: 300 vpm
$O_2$: 10%
$CO_2$: 10%
$H_2O$: 10%
$N_2$: sufficient quantity for 100%

The overall flow rate is 30 l(stp)/h.

The hourly space velocity is of the order of 150,000 $h^{-1}$.

The NO and NOx (NOx=NO+$NO_2$) signals are recorded continuously, as is the temperature in the reactor.

The NO and NOx signals are given by an Ecophysics NOx analyser based on the chemoluminescence principle.

The evaluation of the NOx traps is in two parts:

Firstly, the temperature of maximum adsorption Tmax is determined by adsorbing the NOx at 125° C. for 15 minutes, and by subsequently heating under the same mixture to 600° C. The NOx profile shows an adsorption maximum at a certain temperature, referred to as Tmax.

secondly, the amount isothermally adsorbed (as number of moles of NO) at the temperature of maximum adsorption is determined.

The amount is calculated by integration.

Results

The results are given in the following table:

| Example | Composition of the supported phase (atomic %) | BET surface $m^2/g$ | Amount absorbed ($10^{-5}$ mg NO/150 mol of product) | Tmax ° C. |
|---|---|---|---|---|
| 1 | Mn 5%, K 15% | 47 | 4.4 | 305 |
| 2 | Ba 15%, Mn 5% | 67 | 3.3 | 275 |
| 3 | Mn 5%, K 20% | 33 | 5.2 | 325 |
| 4 | Mn 10%, K 15% | 49 | 5.2 | 295 |
| 5 | Mn 13.6%, K 13.6% | 49 | 6.9 | 300 |
| 6 | Pr 15%, Mn 5% | 77 | 3.1 | 270 |

It may be noted that Tmax may be equal to or greater than 300° C. for certain compositions.

What is claimed is:

1. A composition comprising a support based on a cerium oxide, a zirconium oxide and an oxide of scandium or a rare earth other than cerium, and a supported phase based on manganese and at least one other element selected from the group consisting of the alkali metals, the alkaline-earth metals and the rare earths, wherein the support is of the formula: $Ce_xZr_yM_zO_2$, wherein M represents at least one element selected from the group consisting of scandium and the rare earths other than cerium, and wherein $0<z\leq0.3$, $1<x/y\leq19$ and x, y and z being connected by the equation $x+y+z=1$.

2. A composition according to claim 1, wherein $0.02\leq z\leq 0.2$, and $1\leq x/y\leq 9$.

3. A composition according to claim 1, wherein the support is in the form of a solid solution.

4. A composition according to claim 1, wherein the rare earth of the support is lanthanum, neodymium, or praseodymium.

5. A composition according to claim 1, wherein the support is made by the process of:

a) preparing in a liquid medium a mixture containing a cerium compound, a scandium or rare-earth compound and a zirconium solution, said solution having an amount of base needed to reach the equivalence point during an acid-base titration of this solution having a molar ratio condition $OH^-/Zr\leq 1.65$;

b) heating said mixture to obtain a precipitate; and c) recovering and calcining the precipitate.

6. A composition according to claim 1, wherein the catalytic phase comprises manganese and potassium, at least one of the two elements manganese and potassium being supplied at least partially by potassium permanganate.

7. A process for treating a gas in order to reduce nitrogen oxide emissions, comprising the step of bringing into contact said gas with a composition as defined in claim 1.

8. A process according to claim 7, wherein said gas is an exhaust gas from internal fuel combustion engines.

9. A process according to claim 8 wherein said gas has an oxygen excess relative to the amount needed for a stoichiometric combustion of the fuel.

10. A process according to claim 9, wherein the oxygen in the gas is in an amount of at least 5% by volume.

11. A catalytic system for the treatment of an exhaust gas from internal fuel combustion engines, comprising a composition as defined in claim 1.

12. A composition according to claim 1, wherein the other element is an alkali metal or an alkaline-earth metal.

13. A composition according to claim 11, wherein the alkali metal is potassium, and the alkaline-earth metal is barium.

14. A composition according to claim 1, wherein the other element is a rare earth.

15. A composition according to claim 1, wherein the supported phase further comprises praseodymium.

16. A composition according to claim 1, wherein the support presents a cerium/zirconium atomic proportion of at least 1.

17. A composition, according to claim 1, wherein the support has a specific surface after calcining for 6 hours at 900° C. of at least 35 m2/g.

18. A composition according to claim 1, wherein the support has an oxygen storage capacity at 400° C. of at least 1.5 $mlO_2/g$.

* * * * *